Oct. 22, 1957 R. F. SNYDER 2,810,316
WIDTH MEASURING DEVICE
Filed Sept. 24, 1954 2 Sheets-Sheet 1

INVENTOR.
ROBERT F. SNYDER
BY
R. L. Miller
ATTORNEY

Oct. 22, 1957  R. F. SNYDER  2,810,316
WIDTH MEASURING DEVICE
Filed Sept. 24, 1954  2 Sheets-Sheet 2

INVENTOR.
ROBERT F. SNYDER
BY
R. L. Miller
ATTORNEY

United States Patent Office 2,810,316
Patented Oct. 22, 1957

2,810,316

WIDTH MEASURING DEVICE

Robert F. Snyder, Lakemore, Ohio, assignor to The Goodyear Tire & Rubber Company, Akron, Ohio, a corporation of Ohio Application September 24, 1954, Serial No. 458,193

1 Claim. (Cl. 88—14)

This invention relates to a device for measuring the width of a moving web and more particularly to a device for measuring the width of a continuous strip placed upon and supported by a flat conveyor belt.

In many industrial applications it is desired to measure the width of a conveyed continuous layer of material and to accomplish this without physically contacting the material proper in order to avoid deformation or blemishment. Additional complications are introduced by the erratic placement of the material on the conveyor belt and the irregular travel of the belt itself.

The general object of the invention is to provide a device to measure the width of a moving flat strip and to indicate or record or control the width.

Another object of the invention is to provide a device to measure the width of a moving flat strip carried upon a flat conveyor belt.

Yet another object of the invention is to provide a device to measure the width of a moving flat strip without physically contacting the moving strip.

A further object of this invention is to provide a width-measuring device that is automatic and efficient in operation and simple and compact in form.

The aforesaid objects of the invention, and other objects which will become apparent as the description proceeds, are achieved by providing intermediate idler rollers to separate the transported strip from the supporting conveyor belt and a reflecting surface such as a long narrow mirror placed in the space thereinbetween formed. A light-sensitive cell and light source are located adjacent each other and above the strip edge. The light beam which originates in the light source is partially intercepted by the strip edge and is reflected by the mirror to the light-sensitive cell. Two units may be used, each on opposite sides of the strip. Each light unit supplies a signal to a respective control amplifier, the output of which in turn controls motors independently moving the respective light assemblies. The resultant action is such that each of the light assemblies constantly follows its respective strip edge. The comparative distance between the two light assemblies may be determined by servo-type devices and is directly representative of the strip width.

Figure 1:
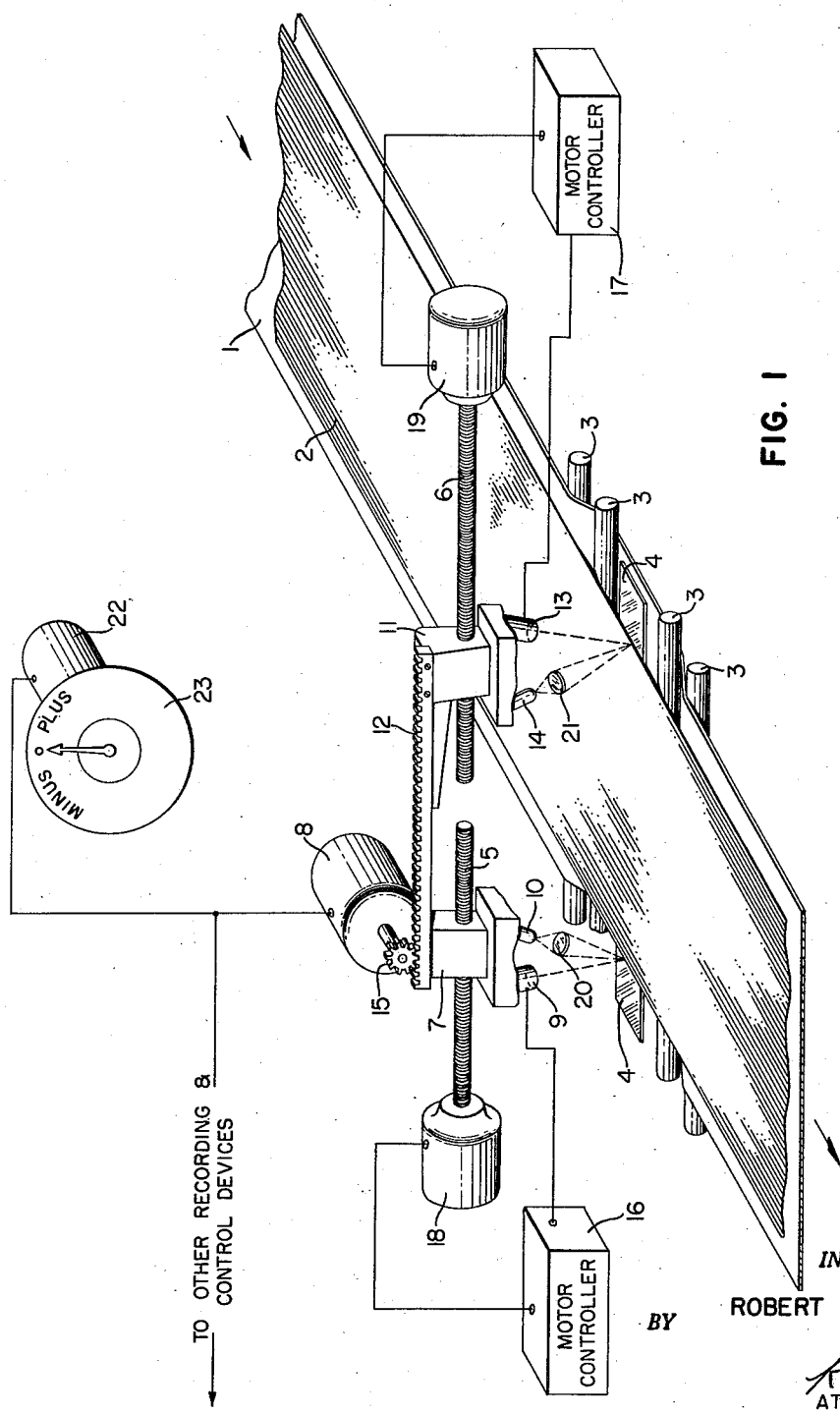
Fig. 1 is a diagrammatic sketch of the invention.

In Fig. 1, a flat moving conveyor belt 1 supports and transports a continuous strip of manufacture 2. The strip 2 may be the extruded product of an extrusion machine, and the belt 1 may be the conveyor in a manufacturing production line. Four idler rolls 3 separate the strip 2 and the belt 1, thereby permitting a reflector such as a rectangular mirror 4 to be located between the strip 2 and the belt 1, the rolls 3 being adjustable to eliminate mechanical interference between the mirror 4 and either the strip 2 or the belt 1. It will be obvious that the roller placement can also be such that the strip 2 is elevated instead of the belt 1 being deflected. It will also be obvious that the invention can be utilized to measure the width of a single unsupported web such as a moving web of fabric and the like.

Suspended above the strip 2 and mirror 4 are two threaded shafts 5 and 6 aligned endwise relative to each other and the axes of which are transversely orientated with reference to the direction of travel of the belt 2. The shaft 5 threadably engages and drives a supporting member 7 having mounted thereon a selsyn generator 8, a light-sensitive device such as a photo-electric cell 9, and a light source 10. The shaft 6 similarly engages and drives a supporting member 11 having mounted thereon a rack gear 12, a light-sensitive device such as a photoelectric cell 13, and a light source 14. A pinion gear 15 is mounted on one extremity of the rotor shaft of the selsyn generator 8. The rack gear 12 engages the pinion gear 15 so that the lateral movement of the support 11 due to rotation of the shaft 6 with a consequent lateral straight-line movement of the rack gear 12 results in a proportional rotation of the pinion gear 15. In some applications it may be desirable to add a further refinement by marking off the surface of the rack gear 12 in linear units and utilizing a pointer mounted on the member 7 superimposed over the inscribed scale to provide a direct visual indication of width measure.

The outputs of the photoelectric cells 9 and 13 are supplied to motor controllers 16 and 17, respectively. The outputs of the controllers 16 and 17 are in turn supplied to and control the rotation of the cell positioning motors 18 and 19 driving the shafts 5 and 6, respectively.

In operation, the light sources 10 and 13 supply a light beam to their respective photoelectric cells 9 and 13 through their respective lens systems 20 and 21. This light beam is partially intercepted by the edges of the strip 2 and then reflected by the mirror 4 to energize the photoelectric cells 9 and 13. As the width of the strip 2 varies, more or less light will be transmitted to the photoelectric cells 9 and 13. This unbalance is supplied to the controllers 16 and 17 and, as will be described hereinafter in greater detail, the cell-positioning motors 18 and 19 are energized, thereby rotating the shafts 5 and 6 and moving the supports 7 and 11 to regain the positioning of the light beam relative to the edge of the strip 2. Each of the motors 18 and 19 can be energized independent of the other. The relative angular displacement of the pinion 15 due to the movement of the support 7 and that of the pinion 15 due to the movement of the rack gear 12, results in a characteristic positioning of the selsyn generator 8 that is proportional to the width of the strip 2. The output of the selsyn generator 8 is connected to a selsyn receiver 22, the rotor of the latter actuating a dial device 23 whereon the width of the strip 2 may be indicated either in deviation plus or minus from some predetermined standard or else in actual dimensional units. As shown, the output of the selsyn generator 8 may also be used to control other devices whereby the width of the strip 2 may be automatically corrected. For example, if the strip 2 is the product of an extrusion machine, the output of the selsyn generator 8 may be used to control the die positioning, chamber pressure, material feed rate, etc. The design of the electrical characteristics of the selsyn combination is such that angular information transmitted from the generator 8 can be amplified at the receiver 22 to any desired degree, thus increasing the sensitivity and accuracy of the invention.

Figure 2:
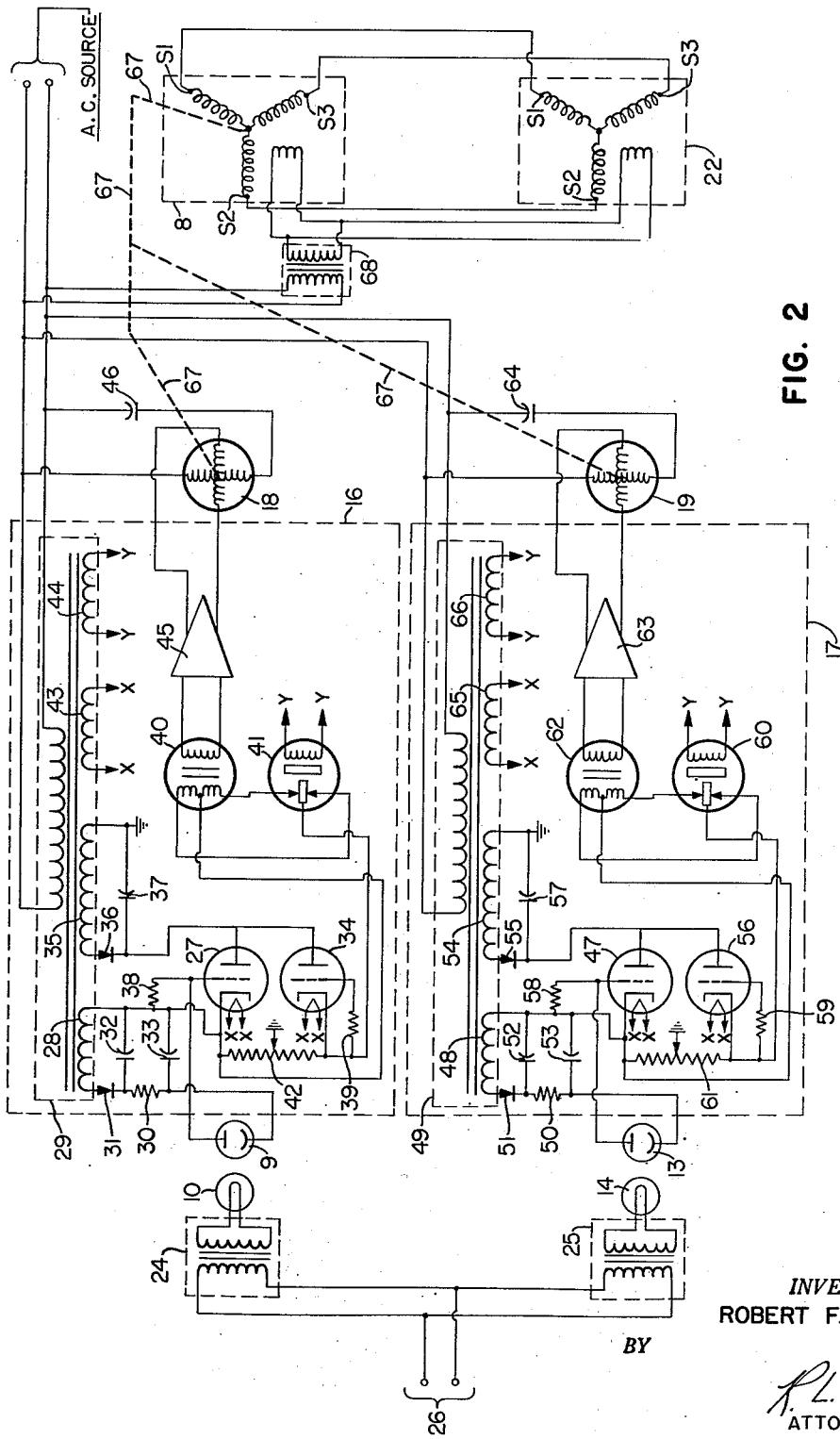
Fig. 2 is an electrical schematic of the control and indicating circuitry of the invention.

Fig. 2 is an electrical schematic of the control and indicating circuitry of the invention. The light sources 10 and 14 are both energized from the respective secondary windings of transformers 24 and 25, the primary windings of which are energized from the terminals 26 whereat an alternating-current potential is applied. The outputs of the photoelectric cells 9 and 13 are supplied to the motor controllers 16 and 17 which in turn determine the amount of rotation for positioning of the cell motors 18 and 19, respectively. A mechanical connection between the motors 18 and 19 and the selsyn generator 8 positions the latter and in turn positions the selsyn receiver 22.

In the motor controller 16 the anode output of the photoelectric cell 9 is supplied to the control element or grid of a triode 27. The cathode of the cell 9 is connected to one side of a secondary winding 28 of a power transformer 29 through a resistor 30 and a rectifier 31. The other side of the secondary winding 28 is connected to the cathode of the triode 27. Two capacitors 32 and 33 are utilized for filtering and are connected across the secondary winding 28, one on each side of the resistor 30.

The anode or plate of the triode 27 is connected to the plate of a triode 34 and to one side of a secondary winding 35 of the transformer 29, the latter connection being through a rectifier 36. The other end of the secondary winding 35 is grounded and a filtering capacitor 37 is connected between the plate of the triode 27 and ground. Both of the grids of the triodes 27 and 34 are connected to their respective cathodes through resistors 38 and 39, respectively.

The cathode of the triode 27 is connected to a center tap on the primary winding of an input transformer 40, the two ends of the primary winding being connected to stationary contact points in a vibrator-type converter 41. The vibrating reed of the converter 41 is connected to the cathode of the triode 34 and also to the cathode of the triode 27 through the non-movable resistance element of a potentiometer 42, the movable element of which is grounded. The driving coil of the converter 41 is energized by the secondary winding 44 of the transformer 29. The secondary winding of the input transformer 40 supplies an input to a high gain, phase-sensitive, alternating current amplifier 45, the output of which in turn is connected to one winding of the positioning motor 18. The other winding of the motor 18 is energized through a capacitor 46 from an alternating current source from which the primary winding of the transformer 29 is also energized.

In like manner the anode output from the cell 13 is connected to the grid of a triode 47. The cathode of the cell 13 is connected to one side of a secondary winding 48 of a transformer 49 through a resistor 50 and a rectifier 51, in the order named. The other side of the secondary winding 48 is connected to the cathode of the triode 47 and also through capacitors 52 and 53 to each side of the resistor 50. The plate voltage supply is furnished by a secondary winding 54 of the transformer 49. One side of the secondary winding 54 is connected through a rectifier 55 to the anodes of the triode 47 and another triode 56, the other side of the winding 54 being grounded. The plate of triode 47 is grounded through a capacitor 57. The grids of each of the triodes 47 and 55 are connected to their respective cathodes through the resistors 58 and 59.

The cathode of the triode 56 is connected to the vibrating reed of a converter 60 and also through the non-movable element of a potentiometer 61 to the cathode of the triode 47, the movable element of the potentiometer 60 being grounded. The primary winding of an input transformer 62 has each extremity connected to one of the stationary contact points of the converter 60 respectively, and a centertap to the cathode of the triode 47. The secondary winding of the transformer 62 is connected to the input of an amplifier 63, and the output of the amplifier 63 is connected to one winding of the cell positioning motor 19; the other winding of the motor 19 being connected to the terminals 47 through a capacitor 64. The secondary winding 65 of the transformer 49 energizes the filaments of the triodes 47 and 56, and the secondary winding 66 energizes the driving coil of the converter 60. The primary winding of the transformer 49 is energized from the terminals 47.

The mechanical connection of Fig. 1 between the positioning motors 18 and 19 and the selsyn generator 8 is shown in Fig. 2 by the broken lines designated by the numberal 67. The rotation of the motors 18 and 19 positions the selsyn generator 8 which is electrically connected to the selsyn receiver 22. The S1, S2, and S3 stator winding terminals of the generator 8 are each connected to the respective S1, S2, and S3 terminals of the receiver 22. Thus any rotary displacement of the rotor of the generator 8 is reflected in a proportional angular displacement of the rotor of the receiver 22. A transformer 68 having the primary winding energized from the terminals 47 and the secondary winding connected to both rotor windings of the generator 8 and the receiver 22 energizes the selsyn combination.

Numerous refinements may be added such as limit switches to prevent equipment interference, warning lights or bells at the selsyn receiver station to provide a visual indication of malfunctioning, etc.

While certain representative embodiments and details have been shown for the purpose of illustrating the invention, it will be apparent to those skilled in this art that various changes and modifications may be made therein without departing from the spirit or the scope of the invention.

I claim:

A device for measuring the width of a moving opaque strip comprising a first and a second photoelectric cell, a first and a second light-beam source mounted adjacent to the first and second photoelectric cells respectively and so orientated with reference to a respective opposed strip edge that the light beams originating therefrom are partially intercepted by said strip edges, light-reflecting means so disposed with relation to the strip edges as to direct the light not intercepted by said edges toward the first and second photoelectric cells and operatively energize said cells, a first and a second supporting means for the first and second photoelectric cells respectively and the first and second light-beam sources respectively, a first and a second driving means to displace the first and second supporting means respectively transversely relative to the direction of strip travel, a first and a second comparing means actuated by the outputs of the first and second photoelectric cells respectively and in turn actuating the first and second driving means respectively to continually tend to maintain a fixed relationship between the first and second supporting means respectively and the respectively strip edges, a selsyn generator mounted on the first supporting means, a spur gear mounted on the shaft of the selsyn generator, a rack gear mounted on the second supporting means and engaging the spur gear to displace the rotor of said generator angularly in porportion to the linear opening between the first and second supporting means, a selsyn receiver, and means to transmit the angular information of the generator to actuate the receiver positioning.

References Cited in the file of this patent

UNITED STATES PATENTS

| | | |
|---|---|---|
| 2,548,590 | Cook | Apr. 10, 1951 |
| 2,674,151 | Garrett et al. | Apr. 6, 1954 |